April 22, 1947.  W. K. CANADAY  2,419,332
AIRPLANE WING STRUCTURE
Filed Dec. 26, 1944
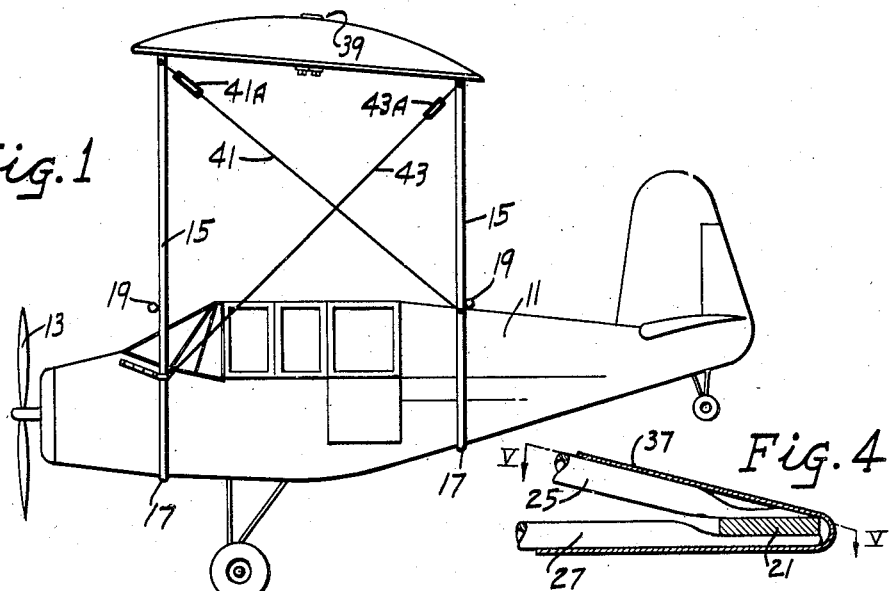
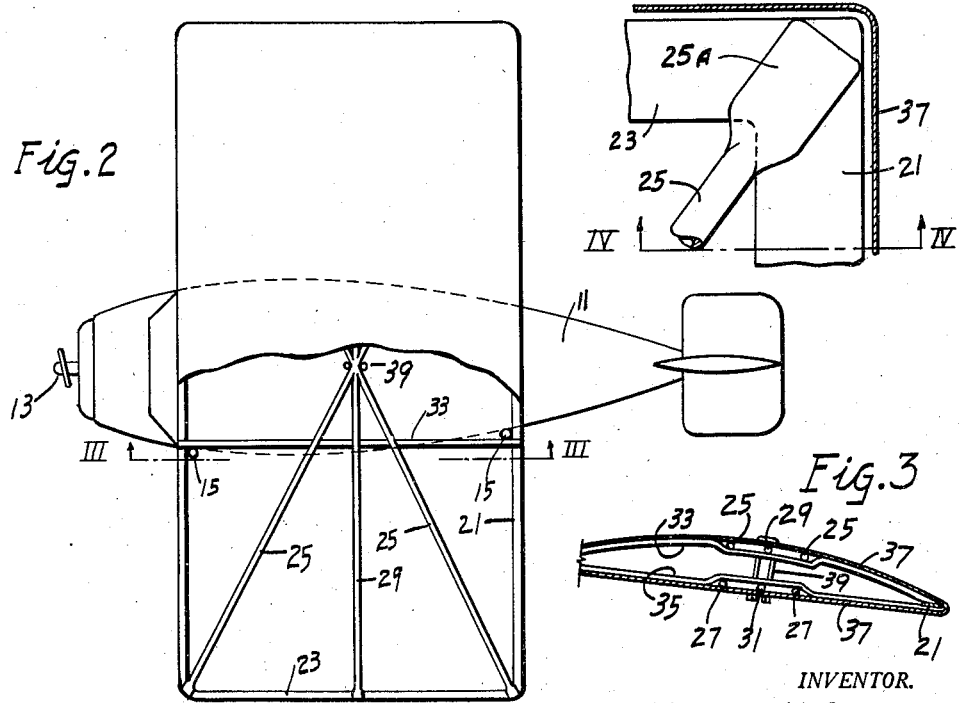
INVENTOR.
WILLIAM K. CANADAY
BY
J. H. Weatherford
ATTY Patented Apr. 22, 1947

2,419,332

UNITED STATES PATENT OFFICE 2,419,332

AIRPLANE WING STRUCTURE

William K. Canaday, Memphis, Tenn.

Application December 26, 1944, Serial No. 569,780

1 Claim. (Cl. 244—117)

This invention relates to airplanes, and has particular reference to the lifting or wing structure, and its support and positioning relatively to the fuselage of the plane.

In present plane construction the wings are variously positioned, varying from high wing planes, in which the wings are substantially at the top level of the fuselage to low wing planes in which the wings are at the bottom level, and in substantially all cases these wings extend laterally several times their fore and aft width, the wing positioning and length establishing unstable support for the plane.

The objects of the present invention are:

To so position and form the wings that they will tend to support the fuselage in, or restore it to, level position, even though forward movement is checked as by engine failure and that they will tend to act in the nature of a parachute in such event.

Further objects are:

To provide a stable and efficient wing structure and means for securing the wing structure to the fuselage through which the wing may be available for use with fuselages of planes now in use.

The means by which the foregoing and other objects are accomplished, and the method of their accomplishment, will readily be understood from the following specification upon reference to the accompanying drawing, in which:

Fig. 1 is a side elevation of a typical airplane fuselage with my improved wing structure secured thereto.

Fig. 2 is a corresponding plan view, with part of the wing covering removed to show the frame structure.

Fig. 3 is a vertical sectional elevation of the wing on the line III—III of Fig. 2.

Fig. 4 is a fragmentary vertical elevation on an enlarged scale taken on the line IV—IV of Fig. 5; and Fig. 5 is a corresponding fragmentary plan of one corner of the wing.

Referring now to the drawing, in which the various parts are indicated by numerals:

11 indicates the plane fuselage and 13 the propeller. 15 are posts which extend upward from the fuselage and support and anchor the wing structure. The posts may extend downward within the fuselage and be anchored to the fuselage frame, or may, as shown, lie along the outside of and be tied together across and beneath the fuselage by transverse members 17. Above the fuselage the posts are tied together by members 19 which closely lie against the fuselage unless in such position the forward one interferes with vision, in which case it may be above the fuselage. At their upper ends the posts are securely anchored to the wing structure.

The wing structure is rectangular in plan and approximately twice as long transversely as it is along the longitudinal axis of the plane. It comprises a rectangular frame having side members 21 and end members 23 formed from a continuous strip of metal of flat rectangular cross section disposed with its greater dimension horizontal. The diagonally opposite corners of this frame are joined by upper ribs 25, preferably tubular, with the ends 25A flattened to overlie the frame, and by underlying ribs 27 having their ends flattened and underlying the frame members, the lower ribs being straight to establish a flat under-surface and the upper ribs arching upwardly from the frame members to establish a truss-like bracing structure. The ends of the tubes are integrated to the frame, as by welding.

Additional upper and lower ribs 29 and 31 extend from side to side of the frame centrally between its fore and aft edges, and pairs of upper and lower ribs 33 and 35 extend from the front to the back edge of the frame, these latter ribs being spaced apart with such relation to the width of the fuselage 11, that the posts 15 which lie against the fuselage at their upper ends will lie against either the inner or outer side of the ribs, the rear posts ordinarily lying between the ribs and the front posts outside of the ribs.

If such condition does not exist with the sets of ribs parallel, the ribs may in construction be so shifted that post contact is made, it being understood that it is immaterial whether the contact is against the inner or the outer side of the post. The ends of these additional ribs are flattened and integrated with the frame, as before described.

Where the ribs 29 and 31 cross the ribs 25 and 27 respectively they are integrated therewith, this being effected either by abutting the crossing ribs against the diagonal ribs and integrating them, as by welding, or, as shown in Fig. 3, by locally deflecting the cross ribs, as the ribs 33, into underlying relation with the diagonal ribs 25 and the rib 29; and the ribs 35 into overlying relation with the ribs 27 and 31 and integrating them at their points of contact.

The structure formed by the frame and trussed ribs is smoothly housed in usual manner, as by thin sheet metal 37 which at the edges of the wing structure may extend slightly past the edge of the frame structure and be bent backward in U-shape, effecting smooth sharply rounded edges, particularly for the leading and trailing edges of the wing.

In the center the upper and lower housing sheets may be clamped against the rib structure by a U-bolt 39, and otherwise the sheets are securely attached to the ribs either similarly or as by welding.

The post structure is braced fore and aft and may be additionally braced crosswise, though this is not shown, by diagonal struts 41, 43, which preferably are wires or cables and include the usual turnbuckles 41A, 43A respectively.

In the above structure it is particularly stressed that the posts are of such heights as to position the wing structure above the fuselage, preferably a distance equal to the fore and aft depth of the wing, but at least a substantial part of this amount.

In positioning the wing structure above the fuselage, the forward edge of the wing is above the trailing edge when in horizontal flight, the slope or pitch being about one in twenty.

The size of the lifting structure will obviously vary with the weight of the plane and load to be carried, for a plane weighing about a ton the size would be about eight by sixteen feet.

I claim:

In an airplane having a fuselage, a wing structure comprising a rigid rectangular frame having a width substantially twice its fore and aft depth, ribs in pairs extending diagonally from the corners of said frame, additional ribs extending fore and aft in pairs spaced apart substantially the width of the fuselage of the plane, and a pair of ribs centrally disposed between the fore and aft edges of said frame, and extending transversely thereacross the ribs of said pairs respectively underlying and overlying the one the other, said ribs being tubular and flattened at their ends to over or underlie said frame, the underlying said ribs being straight to establish a substantially flat under-surface and the upper said ribs arching upwardly and inwardly from said frame to establish a bracing structure, said ribs being rigidly secured together at crossing points; and a smooth cover intimately housing said ribs and said frame, and secured thereto and posts in pairs secured to the opposite sides of said fuselage and spaced along said fuselage to underlie the fore and aft edges of said wing frame, said posts extending vertically from said fuselage and being respectively integrally connected with the frame of said wing at junctions of said additional pairs of ribs therewith.

WILLIAM K. CANADAY.

REFERENCES CITED

The following references are of record in the file of this patent:

UNITED STATES PATENTS

| Number | Name | Date |
|---|---|---|
| 1,755,828 | Kories | Apr. 22, 1930 |
| 1,866,214 | Lanier | July 5, 1932 |
| 2,063,456 | Nemeth | Dec. 8, 1936 |
| 1,453,114 | Rapp et al. | Apr. 24, 1923 |
| 1,555,409 | Gilmore | Sept. 29, 1925 |
| 1,760,787 | Slinn | May 27, 1930 |
| 1,992,560 | Welman et al. | Feb. 26, 1935 |